(12) United States Patent
Lee et al.

(10) Patent No.: US 7,658,514 B2
(45) Date of Patent: Feb. 9, 2010

(54) LIGHT GUIDE, METHOD AND APPARATUS FOR MANUFACTURING THE SAME, AND ILLUMINATING SYSTEM HAVING THE SAME

(75) Inventors: Sang Hoon Lee, Chungcheongbuk-do (KR); Kab Jin Hwang, Chungcheongbuk-do (KR)

(73) Assignee: LG Electronics Inc., Youngdeungpo-gu (KR)

( * ) Notice: Subject to any disclaimer, the term of this patent is extended or adjusted under 35 U.S.C. 154(b) by 92 days.

(21) Appl. No.: 11/636,553

(22) Filed: Dec. 11, 2006

(65) Prior Publication Data

US 2007/0242473 A1  Oct. 18, 2007

(51) Int. Cl.
  *F21V 7/00* (2006.01)
(52) U.S. Cl. .................... 362/307; 362/555; 385/126
(58) Field of Classification Search ................ 362/307, 362/555, 560, 308, 309, 311, 617–619; 385/133, 385/123, 125, 126, 36
  See application file for complete search history.

(56) References Cited

U.S. PATENT DOCUMENTS

| | | | | | |
|---|---|---|---|---|---|
| 2,175,067 | A | * | 10/1939 | Rolph | 362/337 |
| 2,334,005 | A | * | 11/1943 | Hoeveler | 362/223 |
| 3,583,786 | A | * | 6/1971 | Marcatili | 385/125 |
| 3,902,879 | A | * | 9/1975 | Siegmund | 65/409 |
| 4,195,907 | A | * | 4/1980 | Zamja et al. | 385/125 |
| 4,422,719 | A | * | 12/1983 | Orcutt | 385/123 |
| 4,615,579 | A | * | 10/1986 | Whitehead | 385/133 |
| 4,787,708 | A | * | 11/1988 | Whitehead | 385/133 |
| 4,806,289 | A | * | 2/1989 | Laursen et al. | 264/1.29 |
| 4,996,632 | A | * | 2/1991 | Aikens | 362/560 |
| 5,233,679 | A | * | 8/1993 | Oyama | 385/146 |
| 5,258,896 | A | * | 11/1993 | Dreyer, Jr. | 362/307 |
| 5,416,875 | A | * | 5/1995 | Keplinger et al. | 385/102 |
| 5,475,785 | A | * | 12/1995 | Johanson | 385/100 |
| 5,481,637 | A | * | 1/1996 | Whitehead | 385/125 |
| 5,746,502 | A | * | 5/1998 | Huang | 362/223 |
| 5,784,517 | A | * | 7/1998 | Johanson | 385/146 |
| 6,285,814 | B1 | * | 9/2001 | Pojar | 385/133 |
| 6,400,086 | B1 | * | 6/2002 | Huter | 315/56 |
| 6,520,655 | B2 | * | 2/2003 | Ohuchi | 362/612 |

(Continued)

FOREIGN PATENT DOCUMENTS

CN  1451099 A  10/2003

(Continued)

*Primary Examiner*—Gunyoung T Lee
(74) *Attorney, Agent, or Firm*—Birch, Stewart, Kolasch & Birch, LLP

(57) ABSTRACT

The present invention is directed to a light guide whose one or both sides are structured, a method and an apparatus for manufacturing the same. The present invention is also directed to an illuminating system using the light guide whose one or both sides are structured. The illuminating system comprises a light source part including a light source generating a light and an optical guide optically connected with the light source part for emitting a light inputted from the light source part to outside. The optical guide comprises a hollow outer pipe and a hollow inserted body inserted into the outer pipe, wherein its one side is extended in a substantially same direction as a longitudinal direction to the optical guide, and it is structured with a plurality of linear structures arranged side by side.

12 Claims, 12 Drawing Sheets

U.S. PATENT DOCUMENTS

| | | | |
|---|---|---|---|
| D472,667 S * | 4/2003 | Herst et al. | D26/118 |
| D472,668 S * | 4/2003 | Herst et al. | D26/118 |
| 6,621,973 B1 * | 9/2003 | Hoffman | 385/133 |
| 6,621,978 B1 * | 9/2003 | Choi et al. | 385/146 |
| 6,637,924 B2 * | 10/2003 | Pelka et al. | 362/555 |
| 6,954,575 B2 * | 10/2005 | Fermann et al. | 385/128 |
| 7,273,300 B2 * | 9/2007 | Mrakovich | 362/249 |

FOREIGN PATENT DOCUMENTS

| | | |
|---|---|---|
| JP | 06-235918 A | 8/1994 |
| JP | 2002-237203 A | 8/2002 |
| KR | 2002-0084188 A | 11/2002 |
| KR | 2002-0084191 A | 11/2002 |
| WO | WO-01/71247 A1 | 9/2001 |
| WO | WO-01/71396 A1 | 9/2001 |
| WO | WO-01/71396 A1 | 9/2001 |

\* cited by examiner

LIGHT GUIDE, METHOD AND APPARATUS FOR MANUFACTURING THE SAME, AND ILLUMINATING SYSTEM HAVING THE SAME

CROSS-REFERENCE TO RELATED APPLICATIONS

The present application claims the benefit of priority under 35 U.S.C. 119 based on the Korean Patent Applications Nos. 10-2006-0033586 filed on Apr. 13, 2006; 10-2006-0053199 filed on Jun. 13, 2006; and 10-2006-0066761 filed on Jul. 18, 2006. These applications are incorporated herein by references.

BACKGROUND

1. Field

The present invention is directed to a light guide one or both surfaces of which are structured, and a method and an apparatus for manufacturing the same. The present invention is also directed to an illuminating system using the light guide one or both surfaces of which are structured.

2. Background

An illuminating apparatus using an optical guide by which a light can be transmitted to far distance with relatively small transmission loss is known in the art. The optical guide is also called as a light conduit, a light pipe, or a light tube, and is used for effectively distributing a decorative or functional light over a relatively large area.

As well known in the art, the optical guide can get by roll-working an optical lighting film made of transparent polymer material in a tube form, and fixing it inside a transparent acryl pipe. The optical lighting film includes a smooth inner side not structured and an outer side structured with linear prism arrays forming a plurality of triangle grooves along with a certain direction. According to the above structural feature, the optical guide transmits a light in the longitudinal direction of the optical guide by which a light inputted into the optical guide within certain angle is restricted to inside the optical guide by inner total reflection. The typical optical guide like the above is disclosed in U.S. Pat. No. 4,805,984, which was cited in this application as reference.

Below, the principles of light transmission and reflection of the optical guide having the above construction will be explained in the scope necessary to understand the present invention with reference to the drawings.

FIG. 1A is a cross-sectional view illustrating a part of an optical lighting film to describe transmission and reflection in an optical guide of an illuminating system in the art. And, FIG. 1B is a perspective view illustrating a part of an optical lighting film to describe transmission and reflection in an optical guide of an illuminating system in the art. But, for convenience's sake, in the figures, unstructured inner side is upper side, and structured outer side is lower side.

Referring to FIG. 1A and FIG. 1B, a light from a light source (not shown) is incident and refracted to an unstructured inner side of the optical lighting film (point 1), total-reflected on both sides of a prism of the structured outer side (point 2 and point 3), whereby the light proceeding to outside is refracted at the inner side (point 4), and is inputted again to inside, as shown by the arrow. As this total-reflection process is repeated, the light is substantially proceeding along with the longitudinal direction of the optical guide. Thus, the transmission ability of a light generated from the light source can be enhanced by using the optical lighting film.

The illuminating system in the art like the above improves the transmission ability of a light generated from a light source by using the optical lighting film, but there was a wide difference in luminance between far distance and short distance from the light source. That is, it was difficult to properly control the light transmission inside the optical guide and the light emission to outside, and so difficult to obtain uniform brightness in the longitudinal direction of the optical guide in the illuminating system in the art.

The above references are incorporated by reference herein where appropriate for appropriate teachings of additional or alternative details, features and/or technical background.

BRIEF DESCRIPTION OF THE DRAWINGS

Preferable embodiments of the present invention will be described in detail with reference to the following drawings in which same reference numerals refer to same elements wherein.

DETAILED DESCRIPTION OF THE INVENTION

One object of the present invention is to provide an optical guide capable of distributing a light in the longitudinal direction of the optical guide, and an illuminating system using the same.

Another object of the present invention is to provide a method and an apparatus for manufacturing an optical lighting film both surfaces of which are structured by continuous process.

Further scope of applicability of the present invention will become apparent from the detailed description given hereinafter. However, it should be understood that the detailed description, and specific examples indicating preferred embodiments of the invention, are given by way of illustration only, since various changes and modifications within the spirit and scope of the invention will become apparent to those skilled in the art from the detailed description.

In the following drawings, same reference numbers will be used to refer to same or similar parts through all the embodiments. In addition, detailed descriptions for identical parts are not repeated.

Figure 1A:
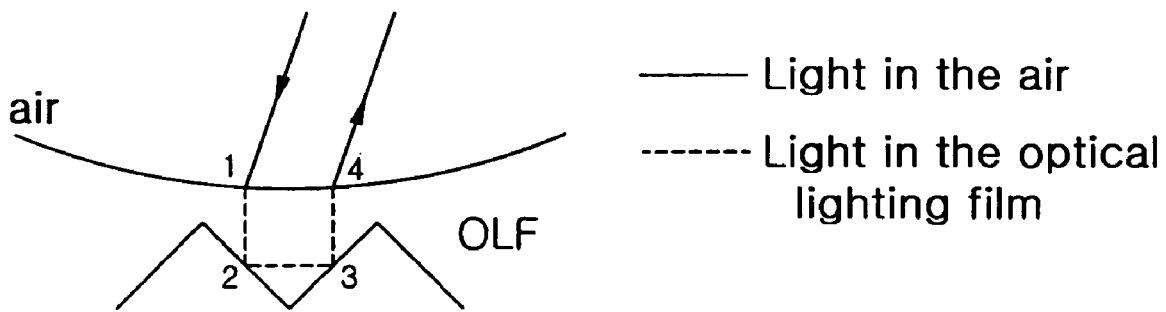
FIG. 1A is a cross-sectional view illustrating a part of an optical lighting film to describe the transmission and reflection of a light in an optical guide used in an illuminating system in the art.
Figure 1B:
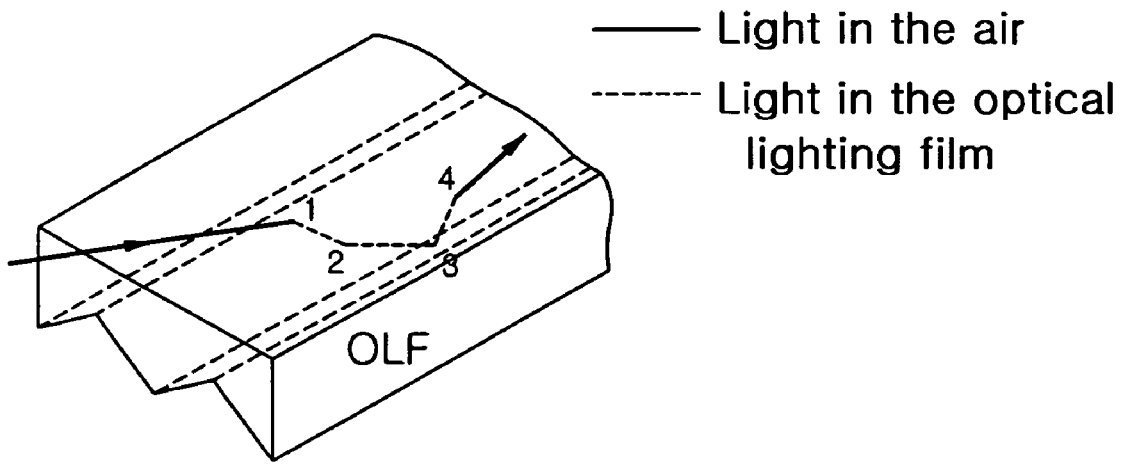
FIG. 1B is a perspective view illustrating a part of an optical lighting film to describe the transmission and reflection of a light in an optical guide used in an illuminating system in the art.
Figure 2:
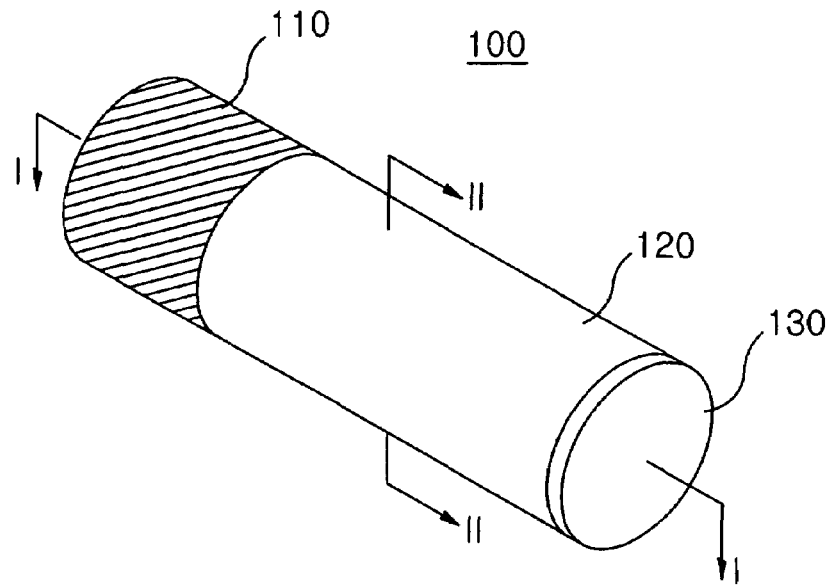
FIG. 2 is an perspective view illustrating the illuminating system according to a first embodiment of the present invention.
Figure 3:
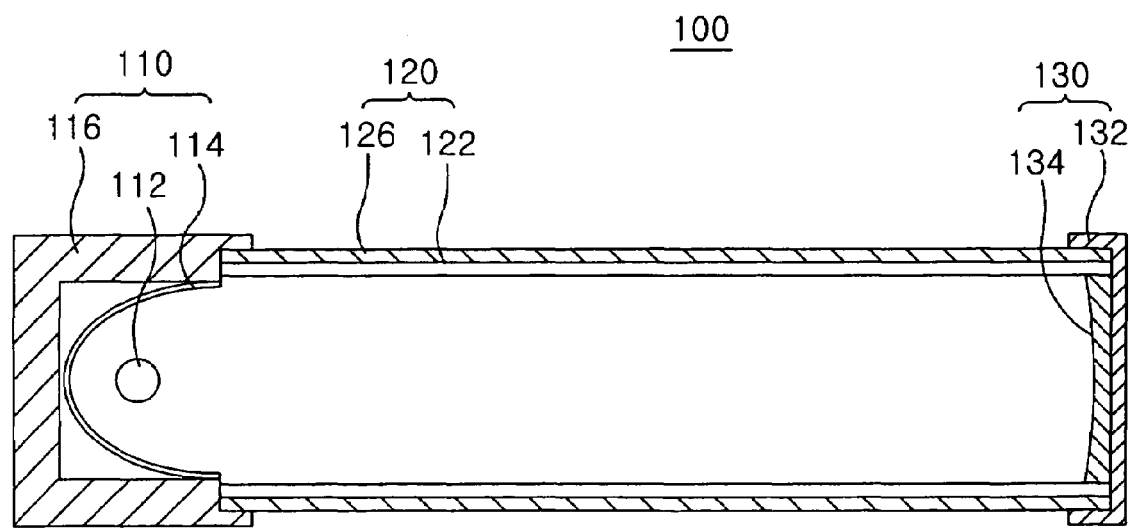
FIG. 3 is a cross-sectional view illustrating the illuminating system according to the first embodiment of FIG. 2 taken along the line I-I.
Figure 4A:
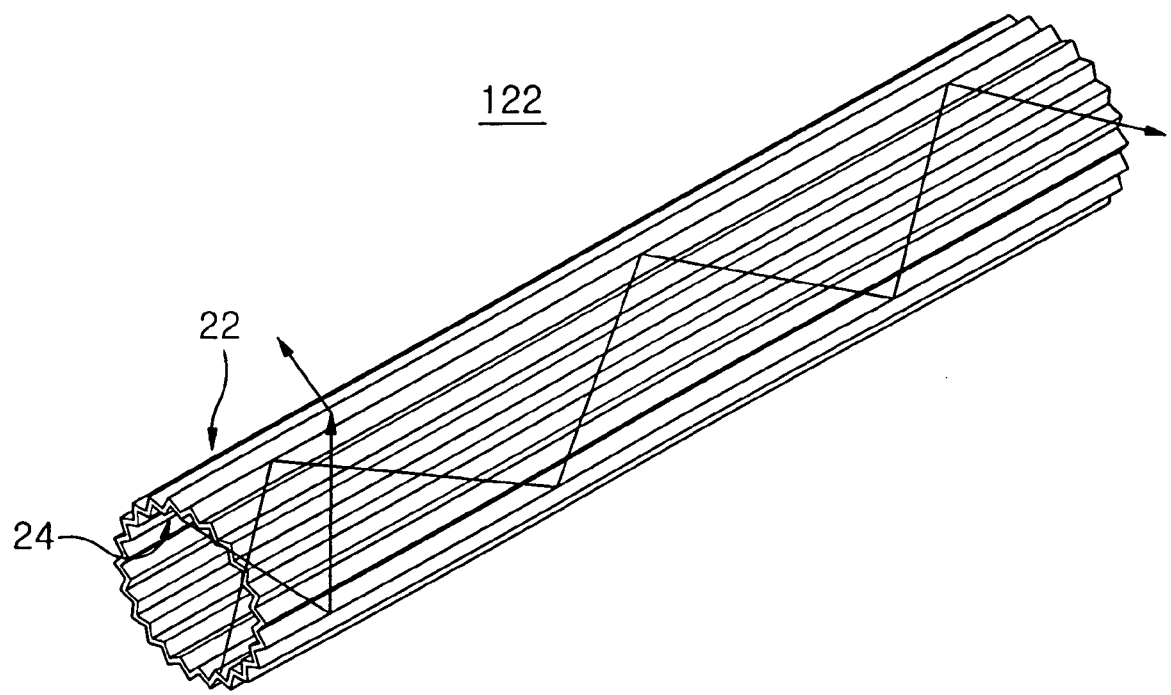
FIG. 4A and FIG. 4B are a perspective view and a cross-sectional view illustrating the inserted body of FIG. 3.
Figure 4B:
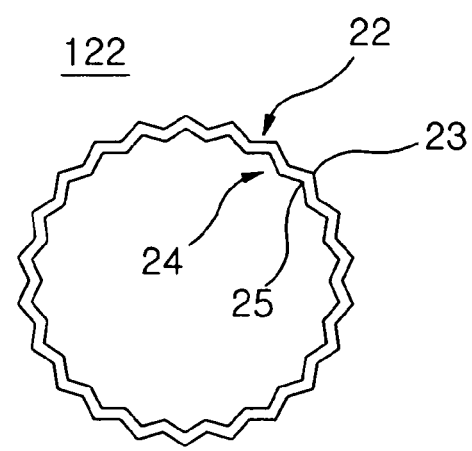

FIG. 2 is a perspective view illustrating the illuminating system according to one embodiment of the present invention. FIG. 3 is a cross-sectional view illustrating the illuminating system according to a first embodiment of FIG. 2 taken along the line I-I. And, FIG. 4A and FIG. 4B are a perspective view and a cross-sectional view illustrating the inserted body of FIG. 3.

Referring to FIGS. 2 and 3, the illuminating system 100 according to one embodiment of the present invention comprises a light source part 110, an optical guide 120 and a reflection cap 130.

The light source part 110 generates a light by a power supplied from an outer power device (not shown). And, the light generated from the light source part 110 is provided to the optical guide 120 optically connected with the light source part 110.

The light source part 110 comprises a light source 112 generating a light, a reflecting mirror 114 disposed at a back side of the light source 112, and a housing 116 containing the light source 112 and the reflecting mirror 114.

The light source 112 provides a certain wavelength of light with a power supplied from outside. As the light source 112, a variety of light sources disclosed in the art can be used, considering circumstances to set up the illuminating system 100. For example, as the light source 112, a halogen light source, a light emitting diode, a metal halide light source, or a plasma lighting can be used.

The reflecting mirror 114 is disposed at a back side of the light source 112, and reflects a light generated from the light source 112 to be incident to the optical guide 120. The structure of the reflecting mirror 114 is changed according to the length of the optical guide 120 into which the light is inputted, but generally is an aspheric reflecting mirror.

The reflecting mirror 114 can be made of a metal having good processability or a plastic. Here, at least the surface of the reflecting mirror 114 is preferable to have a film made of a metal having superior reflexibility like aluminum or silver.

Inside the housing 116, a space for containing the light source 112 and the reflecting mirror 114 is formed to protect them from outer circumstance. It is preferable that the housing 116 is manufactured by using a material having good strength, superior heat resistance, and superior processability, for example, a metal.

At an end of the housing 116, the optical guide 120 is disposed attach-separably, whereby the light source part 110 is optically connected with the optical guide 120.

The light generated from the light source 112 is inputted inside the optical guide 120, and the optical guide 120 transmits the inputted light in its longitudinal direction, and distributes the light to outside.

The optical guide 120 comprises an outer pipe 126 and an inserted body 122.

The outer pipe 126 is a hollow tube, holds the inserted body 122 inside, and supports it. It is preferable that the outer pipe 126 is made of a thermoplastic resin that has good light transmittance, mechanical strength (especially impact resistance), thermal resistance, and electrical stability. More preferably, the outer pipe 126 is made of polyethylen terephthalate (PET), polycarbonate (PC) or polymethyl methacrylate (PMMA). Most preferably, the outer pipe 126 is made of polymethyl methacrylate (PMMA). Because PMMA has high strength, it is not easily broken and deformed. Also, PMMA has high transmissivity of a visible ray, and so is a suitable material for optical guide.

The inserted body 122 is an optical lighting film both sides of which are structured, or an optical pipe both sides of which are structured.

In detail, referring to FIG. 4A and FIG. 4B, the inserted body 122 according to the first embodiment of the present invention is filled up with transparent medium, for example air, inside, and is an optical pipe or an optical lighting film whose section is actually circled and hollow The inserted body 122 has a suitable structure for transmitting a light inputted through the light source part 110 in its longitudinal direction.

The inserted body 122 includes an outer side 22 which includes a plurality of protrusions 23 in which a section extended to the same direction as the longitudinal direction of the inserted body 122 has a roughly isosceles triangle form.

At this time, the protrusions 23 are arranged on the outer side 22 of the inserted body 122 side by side.

Also, the inserted body 122 includes an inner side 24 opposite to the outer side 22, and the inner side 24 of the inserted body 122 includes a plurality of grooves 25 in which a section extended in the same direction as the longitudinal direction of the insertion body 122 has a roughly isosceles triangle form.

At this time, the grooves 25 are arranged on the inner side 24 of the inserted body 122 side by side.

Such structure that both inner side 24 and outer side 22 of the inserted body 122 are structured is the characteristic of the first embodiment.

At this time, the grooves 25 of the inner side 24 may be disposed corresponding to the protrusions 23 of the outer side 22.

Additionally, the grooves 25 may be disposed on a part of the inner side 24 corresponding to a part of the outer side 22 on which the protrusions 23 is disposed.

In case of manufacturing the inserted body 122 as optical pipe, materials having good light transmittance and mechanical and thermal stability, for example, polycarbonate, polymethyl methacrylate, acryl, polypropylene, polystyrene or polyvinyl chloride, may be used. Preferably, the optical pipe is made of polycarbonate or polymethyl methacrylate.

The inserted body 122 having the above structure of optical pipe may be manufactured as single body by extruding through pre-worked extruder in the longitudinal direction, without additional handling.

However, in case of manufacturing the inserted body 122 as optical lighting film, materials having good light transmittance, mechanical strength (especially impact resistance), thermal resistance, and electrical stability, for example, polycarbonate or polymethyl methacrylate may be used. Such manufactured body is in the form of continuous sheet, and is cut to have a size corresponding to the length of the outer pipe 126, and is rolling-worked in tube form and fixed in an inserted state inside the outer pipe 126.

Below, the transmission and distribution of a light generated in the inserted body 122 having the above structure will be explained. In the present detailed description, "an incident angle" means an angle with a normal line of an interface when a light progressing inside one medium arrives at the interface with another medium.

First, if a light inputted to inside the inserted body 122 has an incident angle more than a critical angle ($\Theta c$) pre-determined by a refractive index ratio with the inserted body 122 and a medium enclosing the inserted body 122, the light is reflected by total reflection condition due to Snell's law well known in the art, whereby the light progressing to outside the inserted body 122 is bound inside the inserted body 122 again, and substantially progresses in the longitudinal direction of the inserted body 122. At this time, the medium filling the inserted body 122 is air, and thus the light may be transported inside the inserted body 122 with little or no loss.

However, the incident light having the incident angle less than the critical angle ($\Theta c$) is outputted to outside the inserted body 122. In this manner, the light inputted to inside the inserted body 122 is transported in the longitudinal direction of the inserted body 122 while it is emitted to outside the inserted body 122.

This technical idea of the present invention is not limited by the structure of the inserted body 122 according to the above embodiment, and various variations and modifications are possible by a skilled person in the art.

Hereinafter, various modifications of the inserted body will be explained as follows.

Figure 5A:
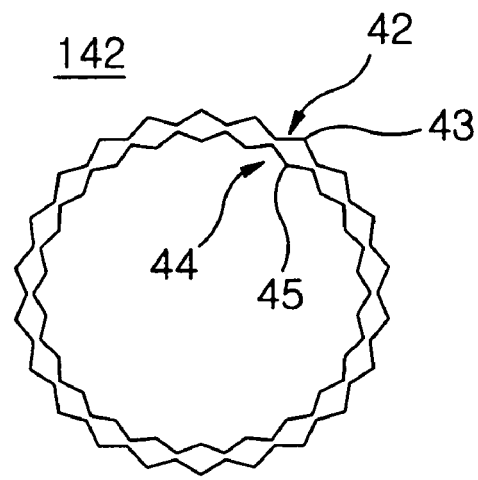
FIG. 5A to FIG. 5C are cross-sectional views illustrating another embodiment of the inserted body of FIG. 3.
Figure 5B:
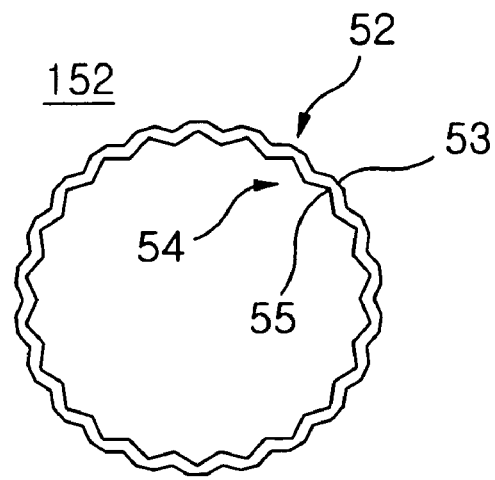
Figure 5C:
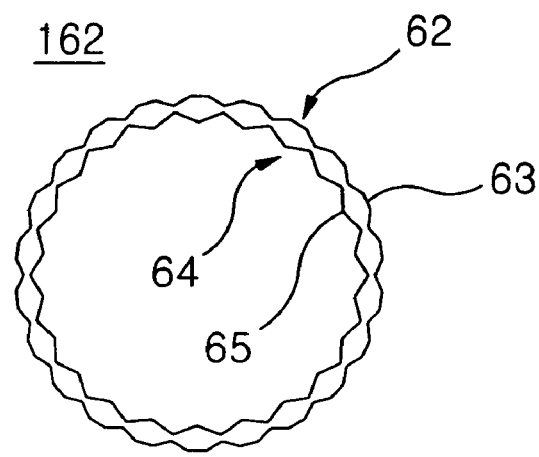

FIG. 5A to FIG. 5C are cross-sectional views illustrating the inserted body according to another embodiment of FIG. 3.

In FIG. 5A, the inserted body 142 includes an outer side 42 which includes a plurality of protrusions 43 in which a section extended in the same direction as the longitudinal direction of the inserted body 142 has a roughly isosceles triangle form.

At this time, the protrusions 43 are arranged on the outer side 42 of the inserted body 142 side by side.

Also, the inserted body 142 includes an inner side 44 opposite to the outer side 42, and the inner side 44 of the inserted body 142 includes a plurality of protrusions 45 in which a section extended in the same direction as the longitudinal direction of the inserted body 142 has a roughly isosceles triangle form.

At this time, the protrusions 45 of the inner side 44 may be disposed corresponding to the protrusions 43 of the outer side 42.

Additionally, the protrusions 45 may be disposed on a part of the inner side 44 corresponding to a part of the protrusions 43 of the outer side 42.

In FIG. 5B, the inserted body 152 includes an outer side 52 which includes a plurality of protrusions 53 in which a section extended in the same direction as the longitudinal direction of the inserted body 152 has a roughly trapezoid form.

At this time, the protrusions 53 are arranged on the outer side 52 of the inserted body 152 side by side.

Also, the inserted body 152 includes an inner side 54 opposite to the outer side 52, and the inner side 54 of the inserted body 152 includes a plurality of grooves 55 in which a section extended in the same direction as the longitudinal direction of the inserted body 152 has a roughly isosceles triangle form.

At this time, the grooves 55 are arranged in the inner side 54 of the inserted body 152 side by side.

A triangle shaped groove 55 of the inner side 54 may be disposed corresponding to the protrusions 53 of the outer side 52.

Additionally, the groove 55 may be disposed on a part of the inner side 54 corresponding to a part of the outer side 52 on which the protrusions 53 is disposed.

In FIG. 5C, the inserted body 162 includes on an outer side 62 which includes a plurality of protrusions 63 in which a section extended in the same direction as the longitudinal direction of the inserted body 162 has a roughly trapezoid form.

At this time, the protrusions 63 are arranged on the outer side 62 of the inserted body 162 side by side.

Also, the inserted body 162 includes an inner side 64 opposite to the outer side 62, and the inner side 64 of the inserted body 162 includes a plurality of protrusions 65 in which a section extended in the same direction as the longitudinal direction of the inserted body 162 has a roughly isosceles triangle form.

At this time, the protrusions 65 are arranged in the inner side 64 of the inserted body 162 side by side.

Like the above embodiment, the protrusions 54 of the inner side 64 may be disposed corresponding to the protrusions 63 of the outer side 62.

Additionally, the protrusions 65 may be disposed on a part of the inner side 64 corresponding to a part of the outer side 62 on which the protrusions 63 is disposed.

Other various embodiments besides the above embodiments will be possible, and will be briefly described in reference with the figures below.

FIG. 6A to FIG. 6D are cross-sectional views illustrating the inserted body according to further another embodiment of FIG. 3.

Figure 6A:
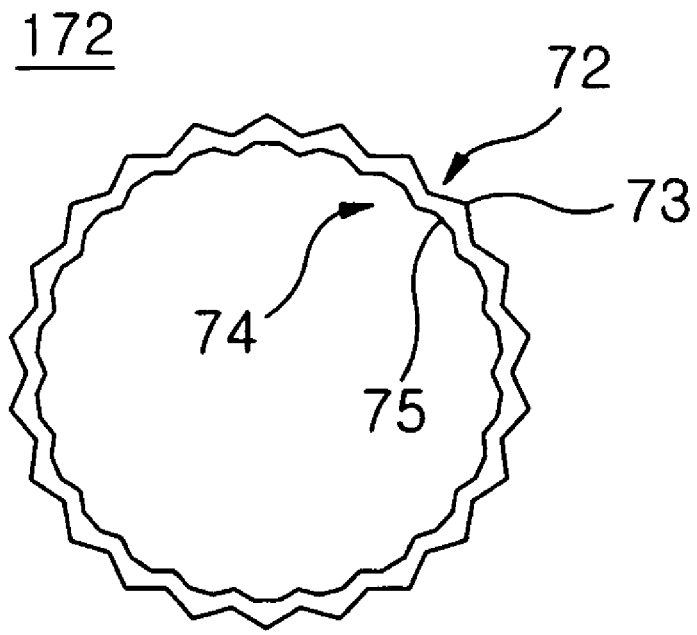
FIG. 6A to FIG. 6D are cross-sectional views illustrating further another embodiment of the inserted body of FIG. 3.

In FIG. 6A, the inserted body 172 includes an outer side 72 which includes a plurality of protrusions 73 in which a section extended in the same direction as the longitudinal direction of the inserted body 172 has a roughly isosceles triangle form, and an inner side 74 which includes a plurality of grooves 75 in which a section extended in the same direction as the longitudinal direction of the inserted body 172 has a roughly trapezoid form.

At this time, the groove 75 of the inner side 74 may be disposed corresponding to the protrusions 73 of the outer side 72.

Additionally, the grooves 75 may be disposed on a part of the inner side 74 corresponding to a part of the outer side 72 on which the protrusions 73 is disposed.

Figure 6B:
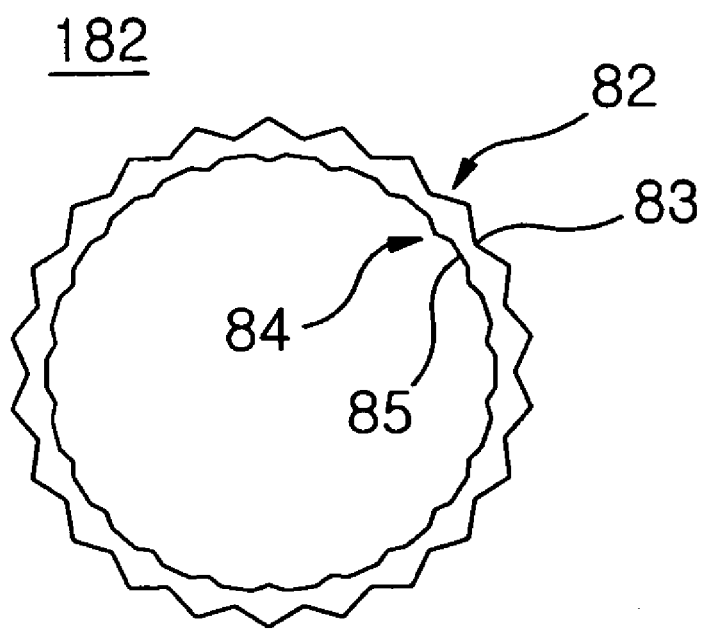

In FIG. 6B, the inserted body 182 includes an outer side 82 which includes a plurality of grooves 83 in which a section extended in the same direction as the longitudinal direction of the inserted body 182 has a roughly isosceles triangle form, and an inner side 84 which includes a plurality of grooves 85 in which a section extended in the same direction as the longitudinal direction of the inserted body 182 has a roughly trapezoid form.

At this time, the grooves 85 of the inner side 84 may be disposed corresponding to the grooves 83 of the outer side 82.

Additionally, the grooves 85 may be disposed on a part of the inner side 84 corresponding to the grooves 85 disposed between the structures 83 on the outer side 82.

Figure 6C:
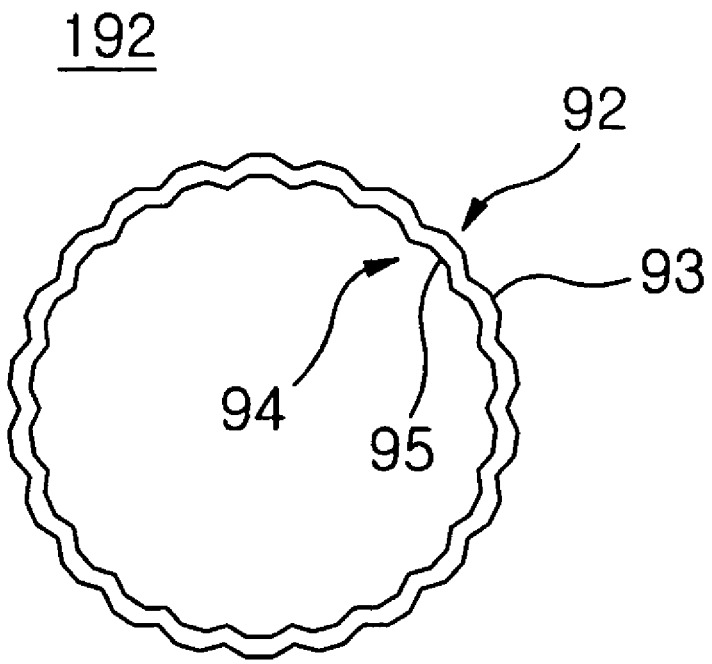

In FIG. 6C, the inserted body 192 includes an outer side 92 which includes a plurality of protrusions 93 in which a section extended in the same direction as the longitudinal direction of the inserted body 192 has a roughly trapezoid form, and an inner side 94 which includes a plurality of grooves 95 which a section extended in the same direction as the longitudinal direction of the inserted body 192 has a roughly trapezoid form.

At this time, the grooves 95 of the inner side 94 may be disposed corresponding to the protrusions 93 of the outer side 92.

Additionally, the grooves 95 may be disposed on a part of the inner side 94 corresponding to a part of the outer side 92 on which the protrusions 93 is disposed.

Figure 6D:
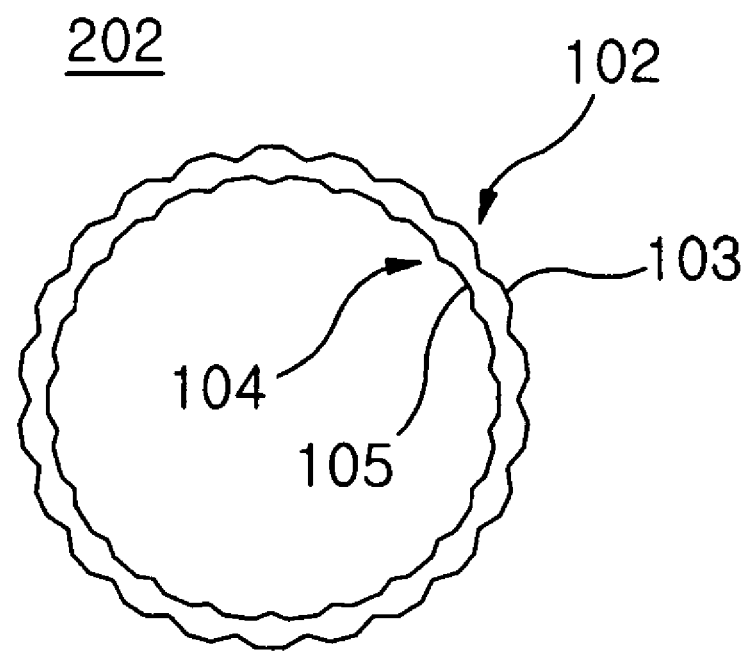

In FIG. 6D, the inserted body 202 includes an outer side 102 which includes a plurality of protrusions 103 in which a section extended in the same direction as the longitudinal direction of the inserted body 202 has a roughly trapezoid form, and an inner side 104 which includes a plurality of grooves 105 in which a section extended in the same direction as the longitudinal direction of the inserted body 202 has a roughly trapezoid form.

At this time, the grooves 105 of the inner side 104 may be disposed corresponding to grooves disposed between protrusions 103 of the outer side 102.

Additionally, the grooves 105 may be disposed on a part of the inner side 104 corresponding to the groove disposed between the protrusions 103 on the outer side 102.

Referring to FIG. 2 and FIG. 3 again, the reflection cap 130 is set up at a terminal of the optical guide 120 attach-separably. The reflection cap 130 increases the use efficiency of a light by reflecting and reusing the light transmitted to the terminal of the optical guide 120, and enhances uniformity of the luminance distribution by increasing brightness at the terminal of the optical guide 120.

The reflection cap 130 includes a cap part 132 and a reflection mirror 134 fixed inside the cap part 132.

The cap part 132 is combined with the optical guide 120 attach-separably so that the reflection mirror 134 is disposed on a terminal of the optical guide 120.

The reflection mirror 134 is disposed inside the reflection cap 130, and reflects the light arrived at a terminal of the optical guide 120. Thus, the reflection mirror 134 may be made of a coating film consisted of a metal material having good light-reflection ratio, for example, a metal like aluminum or silver.

The reflection mirror 134 may be formed in the form of plane or spherical surface reflector. In case the reflection mirror 134 is made of a spherical surface reflector, a concave mirror having the curvature of less than 0.001 is preferable.

Hereinafter, the illuminating system according to a second embodiment of the present invention will be described.

Figure 7A:
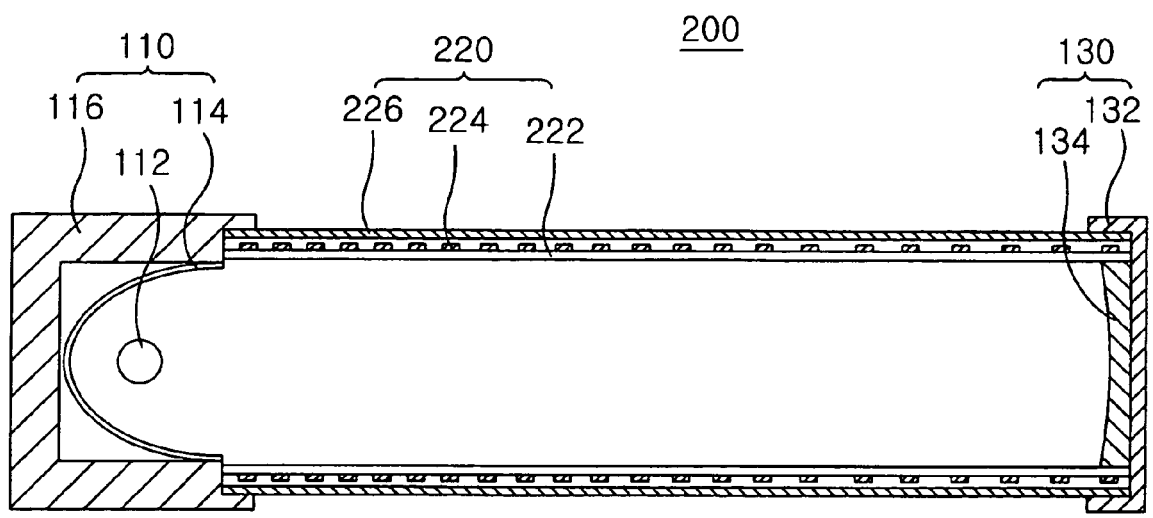
FIG. 7A is a cross-sectional view illustrating the illuminating system according to a second embodiment of FIG. 2 taken along the line I-I.
Figure 7B:
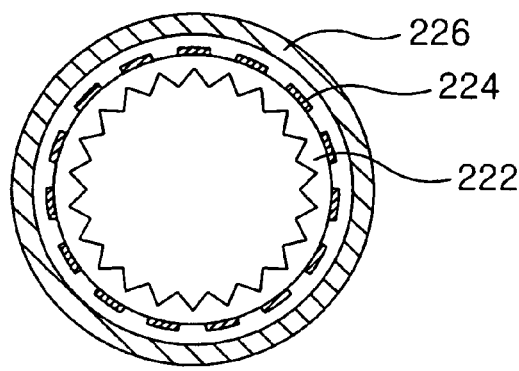
FIG. 7B is a cross-sectional view illustrating the optical guide according to the second embodiment of FIG. 2 taken along the line II-II.
Figure 7C:
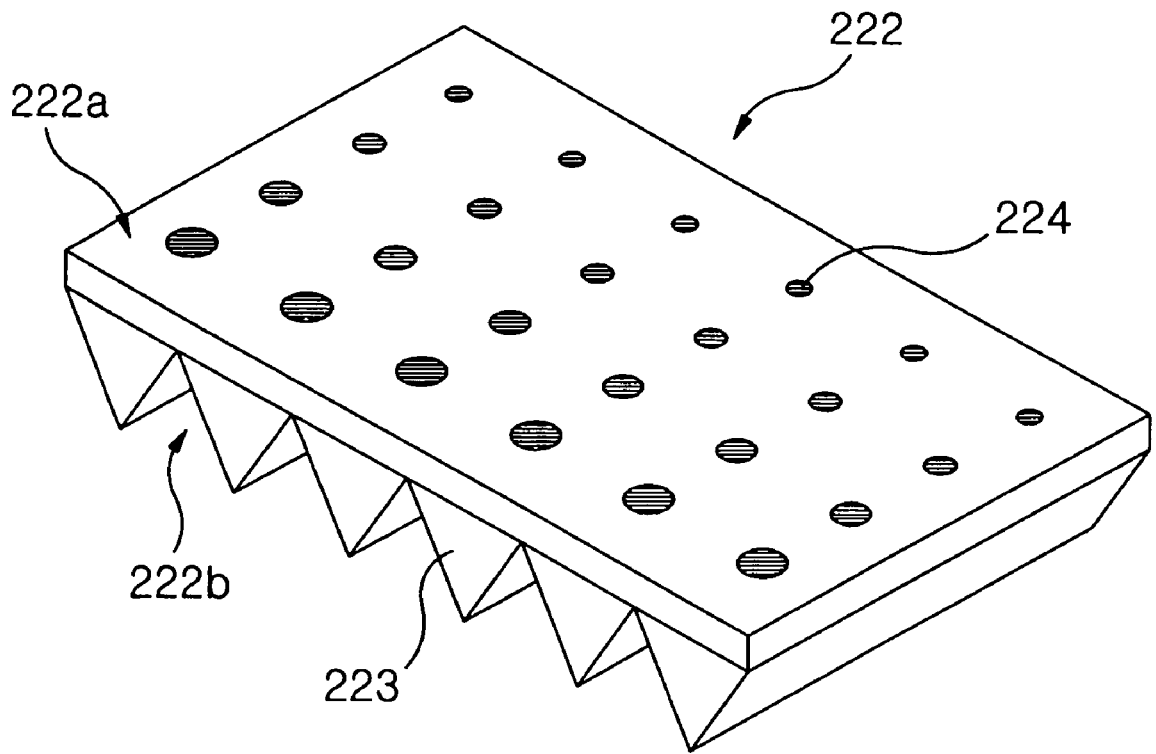
FIG. 7C is a perspective view illustrating a part of the inserted body of FIG. 7A and FIG. 7B.
Figure 8:
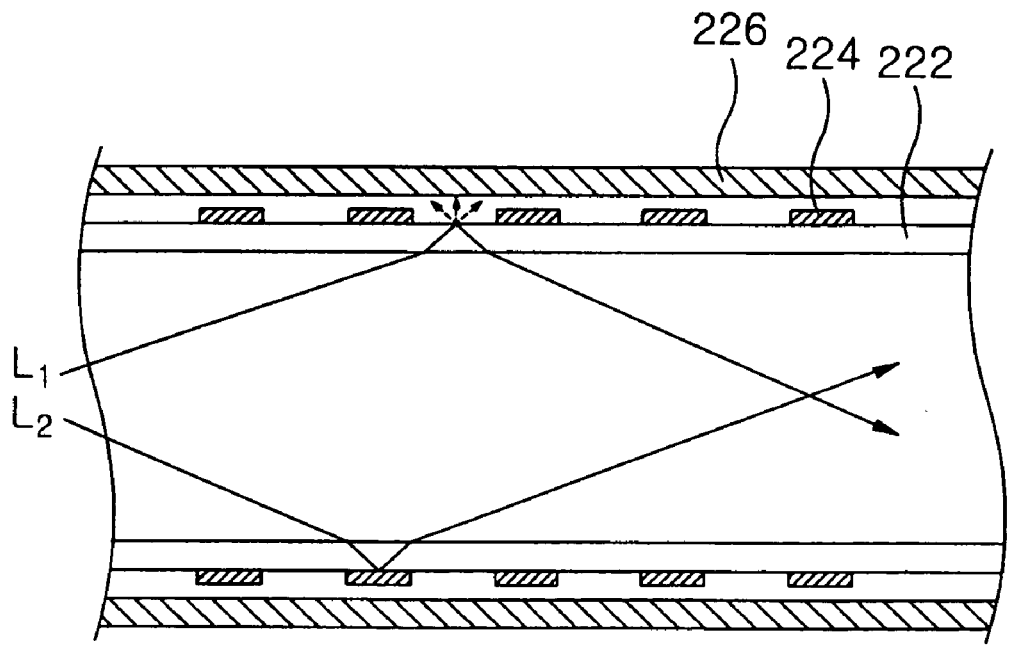
FIG. 8 is a view to describe the transmission and division of a light in the optical guide of FIG. 7A and FIG. 7B.

FIG. 7A is a cross-sectional view illustrating the illuminating system according to the second embodiment of FIG. 2 taken along the line I-I. FIG. 7B is a cross-sectional view illustrating the optical guide according to the second embodiment of FIG. 2 taken along the line II-II. FIG. 7C is a perspective view illustrating a part of the inserted body of FIG. 7A and FIG. 7B. And, FIG. 8 is a view describing the transmission and division of a light in the optical guide of FIG. 7A and FIG. 7B.

In FIG. 2 and FIG. 7A, the illuminating system 200 according to the second embodiment of the present invention comprises the light source part 110, the optical guide 220, and the reflection cap 130. However, the construction of the light source part 110 and the reflection cap 130 according to the second embodiment is the same as the illuminating system 100 according to the first embodiment, and so further explanation thereon will be omitted. Hereinafter, the optical guide 220 will be described in detail.

Referring to FIG. 7A to FIG. 7C, the optical guide 220 comprises an outer pipe 226 and an inserted body 222.

The outer pipe 226 is a hollow tube, accepts the inserted body 222 inside, and supports it. It is preferable that the outer pipe 226 and the inserted body 222 may be made of thermoplastic resin that has good light transmittance, mechanical strength (especially impact resistance), thermal resistance and electrical stability. More preferably, the outer pipe 226 and the inserted body 222 may be made of polyethylen terephthalate (PET), polycarbonate (PC) or polymethyl methacrylate (PMMA). Most preferably, the outer pipe 226 may be made of polycarbonate (PC) and the inserted body 222 may be made of polymethyl methacrylate (PMMA). The PC has high strength, and so is not easily broken nor deformed, and the PMMA has high transmissivity for visible ray, and so is a suitable material for the inserted body 222.

The inserted body 222 is optical lighting film or optical pipe.

In detail, the inserted body 222 according to the second embodiment of the present invention is filled with transparent medium, for example air, inside, and is optical pipe or optical lighting film whose section is substantially circled hollow The inserted body 222 has a preferable structure for transmitting a light inputted from the light source part 110 in its longitudinal direction.

The inner side 222b of the inserted body 222 is structured with a plurality of micro-prisms 223 arranged as micro-pitch in the longitudinal direction. At this time, each section of the prism 223 may be in the form of isosceles triangle, scalene triangle, or regular triangle, preferably isosceles triangle.

The outer side 222a of the inserted body 222 may be a smooth surface not structured, through which the light inputted to the optical guide 220 is outputted.

In the outer side 222a of the inserted body 22, reflecting patterns 224 may form with high reflective materials, for example a metal like Ag or Al. The reflecting patterns 224 may be formed as dot pattern for reflecting the light inputted to the inserted body 222. And, the reflecting patterns 224 reflect and bind a light inside the optical guide 220.

In this manner, a part of the light is transported into the optical guide 220 while the other part of the light is emitted to outside the optical guide 220 through the inserted body 222 so that the light can be outputted from the whole surface of the optical guide 220.

Preferably, an area occupied by the reflecting patterns 224 on the outer side 222a of the inserted body 222 is large near the light source part 110 where the amount of light is much, and is small near the reflection cap 130 where the amount of light is small. That is, the area occupied by the reflecting patterns 224 on the outer side 222a of the inserted body 222 may be decreased in inverse proportion to a distance from the light source part 110. As a result, the light can be uniformly emitted to the whole area of the optical guide 220 regardless of the distance form the light source part 110 because relatively more light is bound inside the optical guide 220 by the reflecting patterns 224 in the area near the light source part 110 than in the area away from the light source part 110.

Optionally, it is possible that the outer side 222a of the inserted body 222 is structured, and the inner side 222b of the inserted body 222 is smooth surface not structured. In this case, the reflecting patterns 224 may be formed in the inner side 222b of the inserted body 222.

Hereinafter, the operation of the illuminating system 200 according to the second embodiment of the present invention will be described.

Referring to FIG. 7A to FIG. 7C and FIG. 8, first, if the power generated from outer power supply (not shown) is supplied to the light source 112, the light source 112 generates a light. A part of the light generated from the light source 112 is inputted directly to inside the optical guide 220 disposed on the front, and a part of the light is reflected at the reflection mirror 114 disposed on the back, and inputted to inside the optical guide 220.

A part of the light L1 inputted to the optical guide 220 is refracted at the prism 223 of the structured inner side 222b of the inserted body 222, and is incident to the outer side 222a of the inserted body 222, specifically an area on which the reflecting patterns 224 are not formed. In short, a part of the light L1 incident to the area on which the reflecting patterns 224 are not formed is transmitted in the longitudinal direction of the optical guide 220 by total reflection, and the other is emitted to outside the optical guide 220.

The other of the light L2 inputted to the optical guide 220 is refracted at the prism of the structured outer side 222a of the inserted body 222, and is incident to the outer side 222a of the inserted body 222, specifically an area on which the reflecting patterns 224 are formed. In short, most of the light L2 incident to the area on which the reflecting patterns 224 are formed is reflected and bound inside the optical guide 220, and a very small amount of the light L2 is dispersed and emitted to outside the optical guide 220.

As explained above, the reflecting patterns 224 of the present invention reflect and bind the light inside the optical guide 220. Thus, considering the amount of light, the reflecting patterns 224 are formed more near the light source part 110 that has relatively more light, while the reflecting patterns 224 are less formed away from the light source part 110 that has relatively less light, whereby the amount of light emitting through the optical guide 220 may be uniform.

A part of the light L1, L2 transmitted in the longitudinal direction of the optical guide 220 is reflected by the reflection mirror 134 of the reflection cap 130 disposed at a terminal of the optical guide 220, and transmitted again to the reverse direction. In the process, the reflected light may be emitted to outside the optical guide 220.

As described above, in the illuminating system 200 according to the second embodiment of the present invention, the amount of light transmitted in the longitudinal direction of the optical guide 220 and the amount of light emitted to outside may be controlled by the reflecting patterns 224 formed on the inserted body 222. Thus, uniform brightness can be obtained over the whole area of the optical guide 220 by overcoming the illumination difference between the close and long distances from the light source part 110.

Hereinafter, the illuminating system according to a third embodiment of the present invention will be described in detail.

Figure 9A:
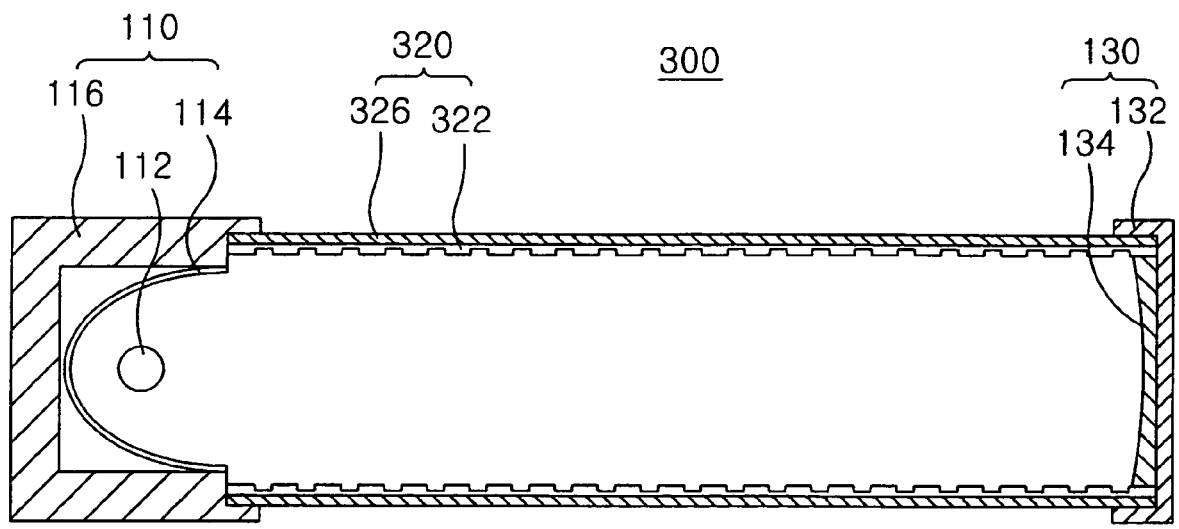
FIG. 9A is a cross-sectional view illustrating the illuminating system according to a third embodiment of FIG. 2 taken along the line I-I.
Figure 9B:
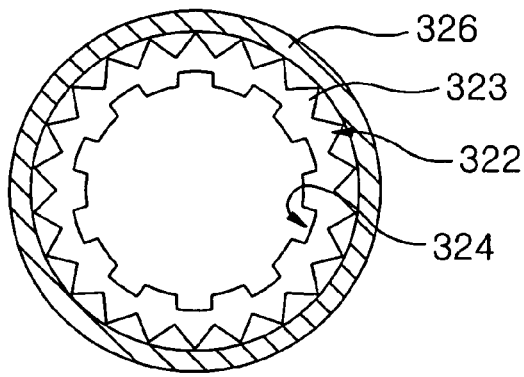
FIG. 9B is a cross-sectional view illustrating the optical guide according to the third embodiment of FIG. 2 taken along the line II-II.
Figure 9C:
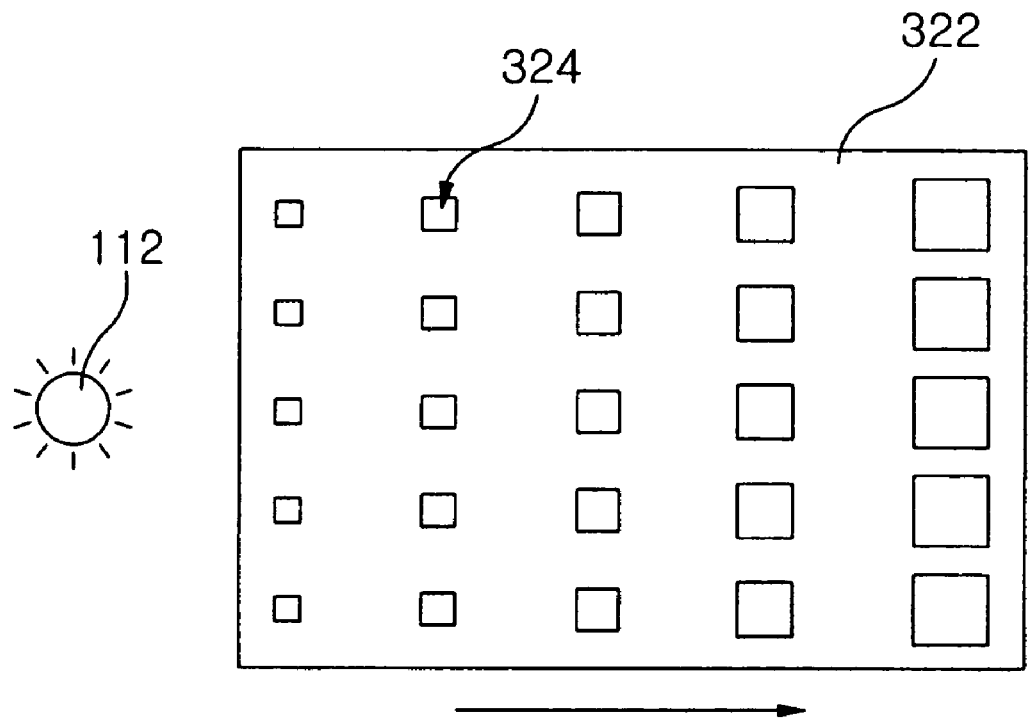
FIG. 9C is a view illustrating other surface of the inserted body of FIG. 9A and FIG. 9B.
Figure 10:
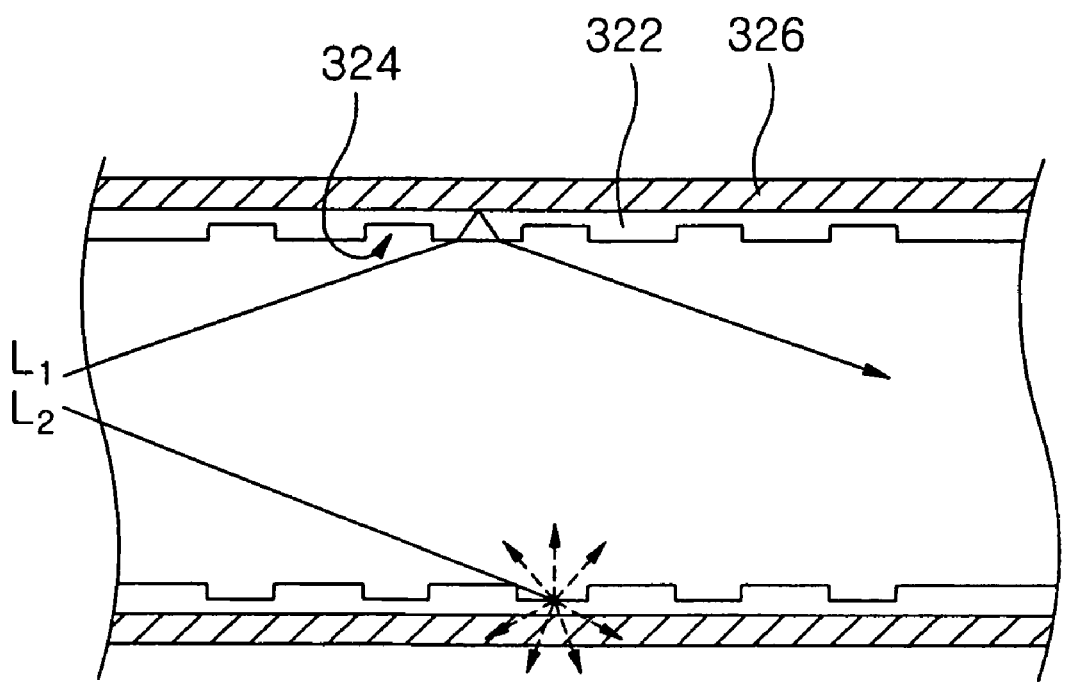
FIG. 10 is a view to describe the transmission and division of a light in the optical guide of FIG. 9A and FIG. 9B.

FIG. 9A is a cross-sectional view illustrating the illuminating system according to the third embodiment of FIG. 2 taken along the line I-I. FIG. 9B is a cross-sectional view illustrating the optical guide according to the third embodiment of FIG. 2 taken along the line II-II. FIG. 9C is a view illustrating other surface of the inserted body of FIG. 9A and FIG. 9B. And, FIG. 10 is a view describing the transmission and division of light in the optical guide of FIG. 9A and FIG. 9B.

In FIG. 2 and FIG. 9A to FIG. 9C, the illuminating system 300 according to the third embodiment of the present invention comprises the light source part 110, the optical guide 320 and the reflection cap 130. However, the construction of the light source part 110 and the reflection cap 130 according to the third embodiment are the same as the illuminating system 100 according to the first embodiment, and so detailed descriptions thereon will be omitted. Hereinafter, the optical guide 320 will be described further.

Referring to FIG. 9A to FIG. 9C, the optical guide 320 comprises an outer pipe 326 and an inserted body 322.

The outer pipe 326 is a hollow tube, accepts the inserted body 322 inside, and supports it. It is preferable that the outer pipe 326 is made of thermoplastic resin that has good light transmittance, mechanical strength (especially impact resistance), thermal resistance and electrical stability. More preferably, the outer pipe is made of polyethylen terephthalate (PET), polycarbonate (PC) or polymethyl methacrylate (PMMA). Most preferably, the outer pipe 326 is made of polycarbonate (PC) and the inserted body 322 may be made of polymethyl methacrylate (PMMA). The PC has high strength, and so is not easily broken nor deformed, and so is a suitable material for the outer pipe 326. And, the PMMA is a suitable material for the inserted body 322 since it has high transmissivity of visible ray.

The inserted body 322 is optical lighting film or optical pipe.

In detail, the inserted body 322 according to the third embodiment of the present invention is filled with transparent medium, for example air, inside, and is optical pipe or optical lighting film that is substantially circled hollow. The inserted body 322 has a preferable structure for transmitting a light inputted from the light source part 110 along with the longitudinal direction.

On one side of the inserted body 322, a plurality of linear prisms 323 are arranged as micro-pitch in the longitudinal direction, whereby the one side of the inserted body 322 is structured. Also, the other side of the inserted body 322 is structured with a plurality of concave parts 324. Thus, both sides of the inserted body 322 are structured.

The section of each linear prism 323 is preferable to have an isosceles triangle form. But, optionally, the section of the linear prism 323 may be isosceles triangle form, scalene triangle form, or regular triangle form.

The formation and arrangement of the concave part 324 formed on the other side of the inserted body 322 is not particularly limited.

In the third embodiment of the present invention, the concave part 324 of the inserted body 322 is a square groove form, and the size is increased in proportion to the distance from the light source 112 as shown in FIG. 9C. The concave part 324 plays a role of emitting a light to outside the optical guide 320 by dispersing the light transported along the optical guide 320. Thus, if the size of the concave part 324 is changed according to the distance from the light source 112, the amount of light transmitted by the inserted body 322 is more near the light source 112, while the amount of light emitted to outside the inserted body 322 is more away from the light source 112.

Hereinafter, the operation of the illuminating system 300 according to the third embodiment of the present invention will be described.

First, if the power generated from outer power supply (not shown) is supplied to the light source 112, the light source 112 generates a light. A part of the light generated from the light source 112 is inputted directly to inside the optical guide 320 disposed on the front, and a part of the light is reflected at the reflection mirror 114 disposed on the back, and inputted to inside the optical guide 320.

The light inputted to the optical guide 320 is transmitted in the longitudinal direction of the optical guide 320 by the inserted body 322 on one hand, and is emitted to outside the optical guide 320 on the other hand. In detail, as shown in FIG. 10, the light L1, L2 is transmitted in the longitudinal direction of the optical guide 320 by total reflection at the plurality of linear prisms 323 formed on one side of the inserted body 322, and is emitted to outside the optical guide 320 dispersed by the plurality of concave parts 324 formed on the other side of the inserted body 322, thereby illuminating the circumstance. Also, the probability that the light L1, L2 is incident to the concave part 324 is increased in proportion to the distance from the light source 112 because the size of the concave part 324 is increased in proportion to the distance from the light source 112. Thus, relatively more light in comparison with a less amount of light is emitted to outside away from the light source 112. As a result, the brightness difference between the close and far distances from the light source 112 can be reduced.

Also, the light transmitted to a terminal of the optical guide 320 is reflected by the reflection mirror 134 disposed at a terminal of the optical guide 320, and transmitted again to the reverse direction. In this process, the reflected light may be emitted to outside the optical guide 320.

As described above, in the illuminating system 300 according to the third embodiment of the present invention, the amount of the light transmitted in the longitudinal direction of the optical guide 320 and the amount of the light emitted to outside may be controlled by using the inserted body 322 whose both sides are structured. Thus, uniform brightness can be obtained over the whole area of the optical guide 320 by overcoming the illumination difference between the close and far distances from the light source part 110.

Hereinafter, another embodiment of the optical guide according to the third embodiment will be described.

Figure 11A:
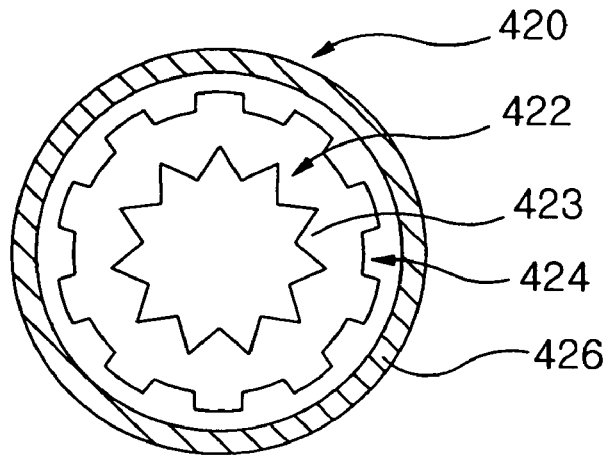
FIG. 11A is a cross-sectional view illustrating another embodiment of the optical guide of FIG. 9A.
Figure 11B:
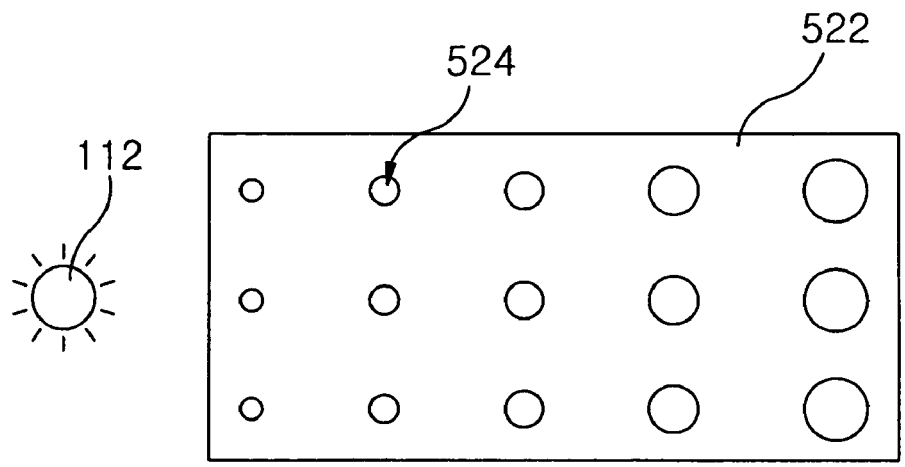
FIG. 11B and FIG. 11C are views partially illustrating one surface of the inserted body, to describe another embodiment of the optical guide of FIG. 9A; and, FIG. 12 is a view schematically illustrating the method and apparatus of the optical lighting film according to one embodiment of the present invention.
Figure 11C:
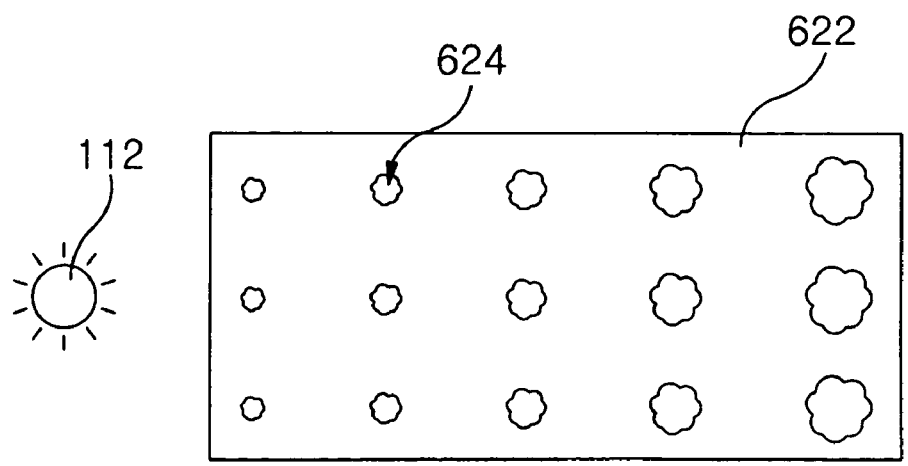

FIG. 11A is a cross-sectional view illustrating the optical guide according to another embodiment of FIG. 9A. And, FIG. 11B and FIG. 11C are views partly illustrating one surface of the inserted body to describe the optical guide according to further another embodiment of FIG. 9A.

The above third embodiment adopted a rolling-worked structure so that in the inserted body 322, the structured side with a plurality of linear prisms 323 is outer side, and the structured side with a plurality of concave parts 324 is inner side. But, the technical idea of the present invention is not limited by such construction of the optical guide 320. That is, as shown in FIG. 11A, in other embodiments of the present invention, the optical guide 420 may be manufactured by inserting and fixing an inserted body 422 into an outer pipe 426, wherein the inserted body 422 is modified to make the structured side with a plurality of linear prisms 423 as inner side, and the structured side with a plurality of concave parts 424 as outer side.

Also, the concave parts 324, 424 formed on one side of the inserted part 322, 422 are not limited to such form and arrangement as shown in FIG. 9C. That is, as shown in FIG. 11B, in another embodiment of the present invention, an inserted body 522 having a circled groove 524 can be used, and as shown in FIG. 11C, an inserted body 622 having an irregular shape of groove 624 can be used.

Also, in the above embodiments, the concave parts 324, 524, 624 are formed to change the size in proportion to the distance from the light source 112, but optionally, the distribution of the concave parts 324, 524, 624 may be changed while the size is maintained. That is, the brightness difference between a short distance from the light source 112 having a sufficient amount of light and a far distance from the light source 112 having a relatively less amount of light can be reduced by increasing distribution of the concave parts 324, 524, 624 in proportion to the distance from the light source 112.

Hereinafter, for a case that the inserted body according to one embodiment of the present invention is manufactured as optical lighting film, the manufacturing method of the optical lighting film and the apparatus for preparing the film will be explained with reference the drawings.

Figure 12:
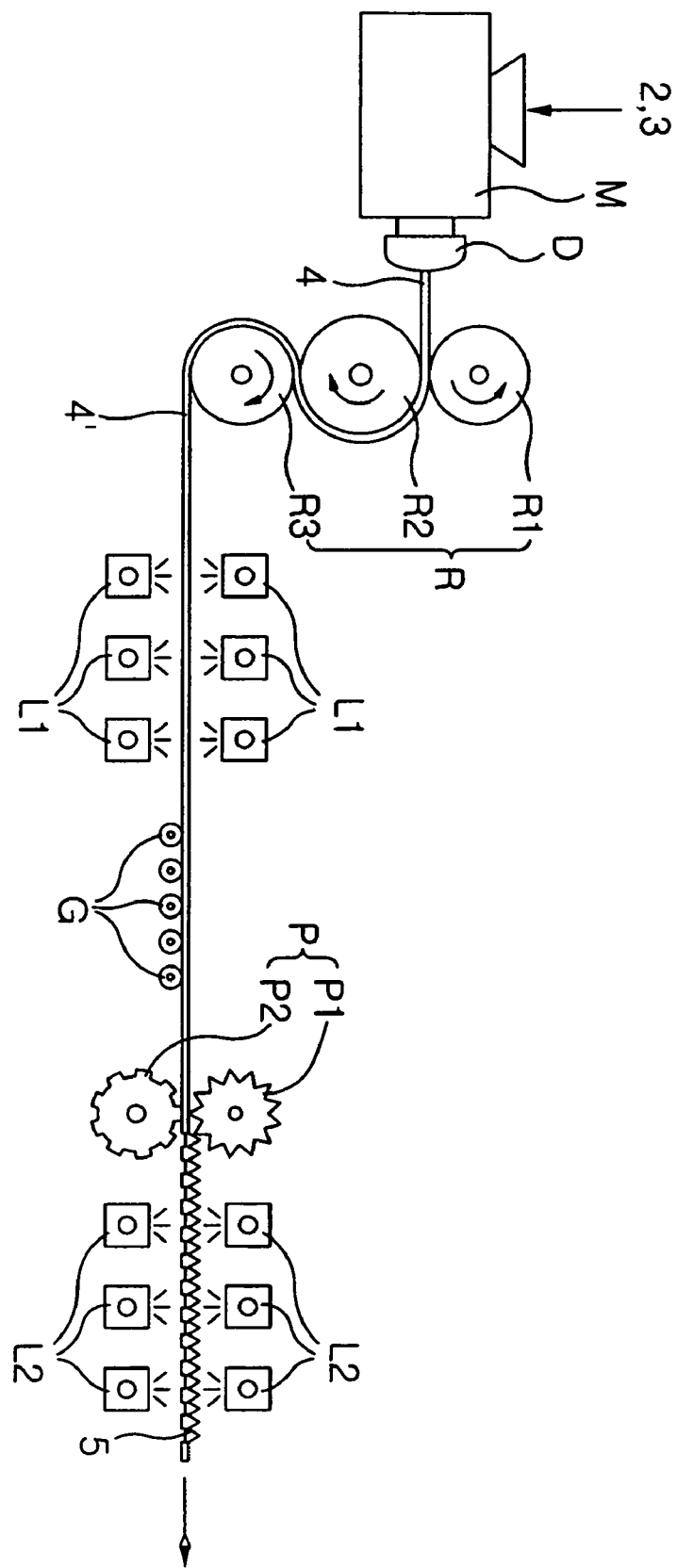

FIG. 12 is a view illustrating the method and apparatus of the optical light film according to one embodiment of the present invention.

The manufacturing apparatus according to one embodiment of the present invention comprises an extruder M, a plurality of calendar rolls R, and a pattern roll P. The extruder M continuously extrudes a thermoplastic resin sheet 4 as sheet form through a die D after heating and melting a material including a thermoplastic resin 2 and an additive 3. The calendar roll R rolls the thermoplastic resin sheet 4' extruded from the extruder M as a thermoplastic resin film 4' having a uniform thickness. The pattern roll P makes the optical lighting film 5 by forming a pattern on both sides of the thermoplastic resin film 4'.

Also, to reduce the manufacturing time, infrared rays-curing agent and/or ultraviolet rays-curing agent can be added optionally as the additive 3. In this case, the manufacturing apparatus of the present invention may comprise a plurality of infrared ray lamps L1 and a plurality of ultraviolet ray lamps L2. The infrared ray lamps L1 are disposed between the calendar roll R and the pattern roll P, and irradiates infrared rays to both sides of the thermoplastic resin film 4'. The ultraviolet ray lamps L2 are disposed at the back of the pattern roll P, and may irradiate ultraviolet rays to the thermoplastic resin film 4', i.e., optical lighting film 5, wherein the thermoplastic resin film 4' is formed at the back of the pattern roll P, and patterned on both sides of the pattern roll P. The curing agent and the lamps L1, L2 can be used to reduce the curing time.

However, a plurality of moving rolls G may be disposed between the calendar roll R and the pattern rolls P for safe moving of the thermoplastic resin film 4'.

The optical lighting film 5 of the present invention is manufactured by using the thermoplastic resin 2. The thermoplastic resin 2 is, for example, polymethyl methacrylate.

The thermoplastic resin 2 is heated and melted by using the extruder M by a well-known method, and continuously extruded as sheet form through the die D. As the die D, general T-die may be used.

The thermoplastic resin sheet 4 extruded through the die D is rolled by the calendar roll R to uniform thickness, for a thin thermoplastic resin film 4'. In case of rolling the thermoplastic resin sheet 4 extruded through the die D as the calendar roll R, the number of rolls is not limited as long as two or more rolls are used. In FIG. 12, three calendar rolls R are used. That is, first, the thermoplastic resin sheet 4 extruded through the die D is pressed and rolled by a first calendar roll R1 and a second calendar roll R2, and further pressed and rolled again between the second calendar roll R2 and a third calendar roll R3.

In case of extruding the thermoplastic resin 2 by heat-melting, the curing time is reduced by using infrared rays-curing agent or ultraviolet rays-curing agent, whereby the manufacturing time of the optical lighting film 5 can be reduced.

In case of using the infrared rays-curing agent as additive 3, the thermoplastic resin film 4' may be half-cured suitable for transferring the pattern to the thermoplastic resin film 4' by irradiating infrared rays on both sides of the thermoplastic resin film 4' through disposing the infrared rays lamp L1 after the step of working both sides of the thermoplastic resin film 4' with the pattern roll P.

The half-cured thermoplastic resin film 4' is inserted in between the pattern rolls P1, P2 by the moving roll G, and then a carved pattern on the surfaces of the pattern rolls P1, P2 is transferred to both sides of the thermoplastic resin. The optical lighting film 5 of the present invention is structured so that one side is linear prism 322 array, and a plurality of concave parts 324 are formed on the other opposite side, as shown in FIG. 9B. Thus, a pattern corresponding to the linear prism 322 is carved on the surface of the pattern roll P1, and a pattern corresponding to the concave part 324 is carved on the surface or the pattern roll P2. The thermoplastic resin film 4' inserted in between the pattern rolls P1, P2 are moved to front by rotating of the pattern rolls P1, P2, and the carved patterns on the surface of the pattern rolls P1, P2 are transferred to both sides of the thermoplastic resin film 4'.

In case of using the ultraviolet rays-curing as additive 3, the thermoplastic resin film 4' may be cured by irradiating ultraviolet rays on both sides of the ultraviolet ray lamp L2 through disposing the ultraviolet ray lamp L2 after the step of working both sides of the thermoplastic resin film 4' with the pattern roll P. Thus completely cured thermoplastic resin film 4' forms the optical lighting film 5 of continuous sheet form.

The present invention has an advantage that the optical lighting film 5 can be manufactured as continuous sheet form.

An embodiment may be achieved in whole or in part by the illuminating system comprising the light source part including the light source generating a light and the optical guide optically connected with the light source part for emitting a light inputted from the light source part to outside. The optical guide comprises the hollow outer pipe and the hollow inserted body inserted into the outer pipe, elongating one side thereof substantially in the same direction as the longitudinal direction to the optical guide, in a plurality of linear structures arranged side by side.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. Particularly, various variations and modifications are possible in the component parts and/or arrangements within the scope of the disclosure, the drawings, and the appended claims. In addition to variations and modifications in the component parts and/or arrangements, alternative uses will also be apparent to those skilled in the art.

What is claimed is:

1. An illuminating system, comprising:
   a light source configured to generate a light; and
   an optical guide optically connected to the light source and configured to transmit the light in a longitudinal direction thereof by total reflection;
   wherein the optical guide comprises:
   a hollow outer pipe; and
   a hollow body rolled and inserted into the hollow outer pipe, extending in a substantially common direction as a longitudinal direction of the optical guide, and including a structured outer side having first protrusions and first grooves and a structured inner side having second protrusions and second grooves,
   wherein the first protrusions and the second grooves extend in a substantially same direction as a longitudinal direction to the optical guide, and
   wherein each of the first protrusions is disposed opposite to a corresponding one of the second protrusions or a corresponding one of the second grooves.

2. The illuminating system of claim 1, wherein the hollow body is a hollow pipe.

3. The illuminating system of claim 1, wherein the hollow body is an optical lighting film.

4. The illuminating system of claim 1, wherein the first protrusions and second grooves on a section of the hollow body each have a substantially common form.

5. The illuminating system of claim 1, wherein the first protrusions and second grooves on a section of the hollow body each have an isosceles triangle shape.

6. The illuminating system of claim 1, wherein the first protrusions and second grooves on a section of the hollow body have a substantially dissimilar form.

7. The illuminating system of claim 1, wherein the first protrusions and second grooves on a section of the hollow body have a trapezoid form and an isosceles triangle form, respectively.

8. The illuminating system of clam 1, wherein a section of the hollow body is in a form of a circle, oval, or polygon.

9. The illuminating system of claim 1, further comprising;
   a reflection mirror disposed at a back side of the light source, and configured to reflect the light to the optical guide.

10. The illuminating system of claim 1, further comprising;
    a reflection cap separably attached to a terminal of the optical guide, and configured to reflect the light to the optical guide.

11. The illuminating system of claim 1, wherein each of the first protrusions is disposed opposite to a corresponding one of the second grooves, and each of the first grooves is disposed opposite to a corresponding one of the second protrusions.

12. The illuminating system of claim 1, wherein a cross section of the first protrusions and second grooves has a form of a triangle.

* * * * *